United States Patent
Ito et al.

(10) Patent No.: US 6,411,770 B1
(45) Date of Patent: Jun. 25, 2002

(54) DATA RECORDING METHOD AND APPARATUS

(75) Inventors: Norikazu Ito; Hiroyuki Fujita; Satoshi Yoneya; Masakazu Yoshimoto; Satoshi Katsuo; Jun Yoshikawa; Satoshi Yutani, all of Kanagawa; Koichi Sato, Tokyo; Tomohisa Shiga; Masaki Hirose, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/346,079

(22) Filed: Jul. 1, 1999

(30) Foreign Application Priority Data

Jul. 2, 1998 (JP) .......................................... 10-187771

(51) Int. Cl.[7] ................................................ H04N 5/91
(52) U.S. Cl. ........................... 386/46; 386/125; 386/52; 707/205; 725/92
(58) Field of Search ................................ 386/125–126, 386/70, 45, 69, 52, 55, 46; 360/60, 57, 50; 369/30.01; 707/205; 725/92; H04N 5/91

(56) References Cited

U.S. PATENT DOCUMENTS

| 5,371,885 A | * | 12/1994 | Letwin ........................ 707/205 |
| 5,481,702 A | * | 1/1996 | Takahashi .................... 707/205 |
| 5,719,983 A | * | 2/1998 | Henderson et al. ........... 386/70 |
| 5,737,743 A | * | 4/1998 | Ooe et al. .................... 707/205 |
| 5,742,443 A | * | 4/1998 | Tsao et al. .................... 360/50 |
| 5,745,756 A | * | 4/1998 | Henley ........................ 707/205 |

FOREIGN PATENT DOCUMENTS

| WO | WO92/22983 | * 12/1992 | .......... H04N/5/781 |

* cited by examiner

*Primary Examiner*—Vincent Boccio
(74) *Attorney, Agent, or Firm*—Frommer Lawrence & Haug LLP; William S. Frommer

(57) ABSTRACT

The endless recording which enables partial saving of recording contents and facilitates editing or management is to be achieved. To this end, if recording has been made for a pre-set time, such as one hour, a new region is secured to continue the recording, at the same time as a region carrying the oldest recorded contents is sequentially evacuated in an amount equal to the newly secured region. The partial saving region (00:10:00:00 to 00:20:00:00) is not to be evacuated.

20 Claims, 15 Drawing Sheets

DATA RECORDING METHOD AND APPARATUS

BACKGROUND OF THE INVENTION

1. Field of the Invention

This invention relates to a data recording method and apparatus. More particularly, it relates to a data recording method and apparatus used when doing endless recording especially in a system, such as an AV server used in, for example, a broadcasting station.

2. Description of the Related Art

An AV server system for doing recording, reproduction, editing or distribution of audio video (AV) data is constituted by a data storage device, formed by a hard disc array in which to store the AV data, a plurality of AV data input/output interfaces, referred to below as channels, for data inputting/outputting from the data storage device, and a system controller for managing control of the overall system. Each channel has a memory for making timing adjustments when outputting AV data from the data recording device or inputting data to the data recording device. The AV server system is configured so that the system controller time-divisionally controls the respective channels to permit the AV data to be inputted to or outputted from the data storage device independently from channel to channel.

If such AV server records the materials used in a single program, a variety of different materials are recorded in the AV server. There is a demand for recording certain specified materials and reproducing the latest one, such as a demand for airing an image of the instant of scoring a gall in a soccer game or of the instant of hitting a homer in a baseball game during live broadcast of a sports game.

However, since the hard disc used in the AV server has only a finite recordable area, the conventional practice for meeting above demand is to secure a specified region and data is overwritten in this region by way of endless recording. In case of this endless recording, there is left on the hard disc the data of a pre-set time duration retrogressive from the time of end of the recording at the recording end time.

In the usual endless recording, it may be contemplated to set a recording region on a hard disc and to effect the recording on end only in this region.

During the usual endless recording, it may be an occurrence that certain recording contents are desired to be saved. In the conventional endless recording, data is erased by the recorded contents being sequentially overwritten at an interval of a pre-set time duration. Moreover, since there is a partial stored region, discrete regions on the hard disc have to be accessed in a skipping fashion when reproducing the latest data to render control difficult in the AV server for a broadcasting station in need of real-time processing.

In addition, in saving the designated region in the conventional endless recording, the usual practice is to save the region with an attribute of a file distinct from the file being recorded. Thus, the following problem arises. That is, the region which could be seen on so-called follow-up reproduction of data in the endless recording in another channel cannot be viewed on follow-up reproduction after the processing of partial saving. Therefore, if the user desires to view a saved region after the designation of partial data saving, it is necessary to open a separate file, thus complicating and worsening the efficiency of the processing in the editing operation. There is also a problem that the subsequent retrieval or management is rendered difficult after doing the partial saving a plural number of times.

SUMMARY OF THE INVENTION

It is therefore an object of the present invention to provide a data recording method and apparatus whereby part of the recording contents can be saved and editing or management can be performed easily.

In one aspect, the present invention provides a data recording method in which input data from outside are processed by respective ones of a plurality of input processing means and the processed input data are outputted to a non-linear-accessible recording medium only within an allocated time slot so as to be recorded on the recording medium. The data recording method includes a first step of securing a first recording region of the recording medium in which the data is recorded, a second step of sequentially recording the data in the first recording region of the recording medium, a third step of newly securing a second recording region and sequentially recording the data in the second recording region when the data is recorded up to the end position of the first recording region, and a fourth step of sequentially evacuating the oldest recorded region of the first recording region in an amount equal to the second recording region secured in the third step.

In another aspect, the present invention provides a data recording apparatus having a non-linear accessible recording medium and a plurality of input/output processing means for converting data inputted from outside into data recorded on the recording medium, the input/output processing means outputting the data converted within allocated time slots to the recording medium to record the data on the recording medium. The data recording apparatus includes control means for securing a first recording region for repeatedly recording the data on the recording medium and for controlling the input/output processing means and the recording medium so that the data will be sequentially recorded in the first recording region. The control means newly secures a second recording region when the data has been recorded up to the end position in the first recording region. The control means controls the input/output processing means and the recording medium so that the data will be sequentially recorded in the second recording region, while also controlling the input/output processing means and the recording medium so that a recording region of the same volume as the secured and recorded second recording region will be sequentially evacuated beginning from the first region.

BRIEF DESCRIPTION OF THE DRAWINGS

FIGS. 2A to 2C show a file system in which, FIG. 2A shows a file entry (FE), FIG. 2B shows a record entry (RE) and FIG. 2C shows a free space list (FSL).

FIGS. 3A to 3C show a memory space on a HD, in which FIG. 3A shows an address space, FIG. 3B shows a file entry and FIG. 3C shows a free space list.

DESCRIPTION OF THE PREFERRED EMBODIMENTS

Figure 1:
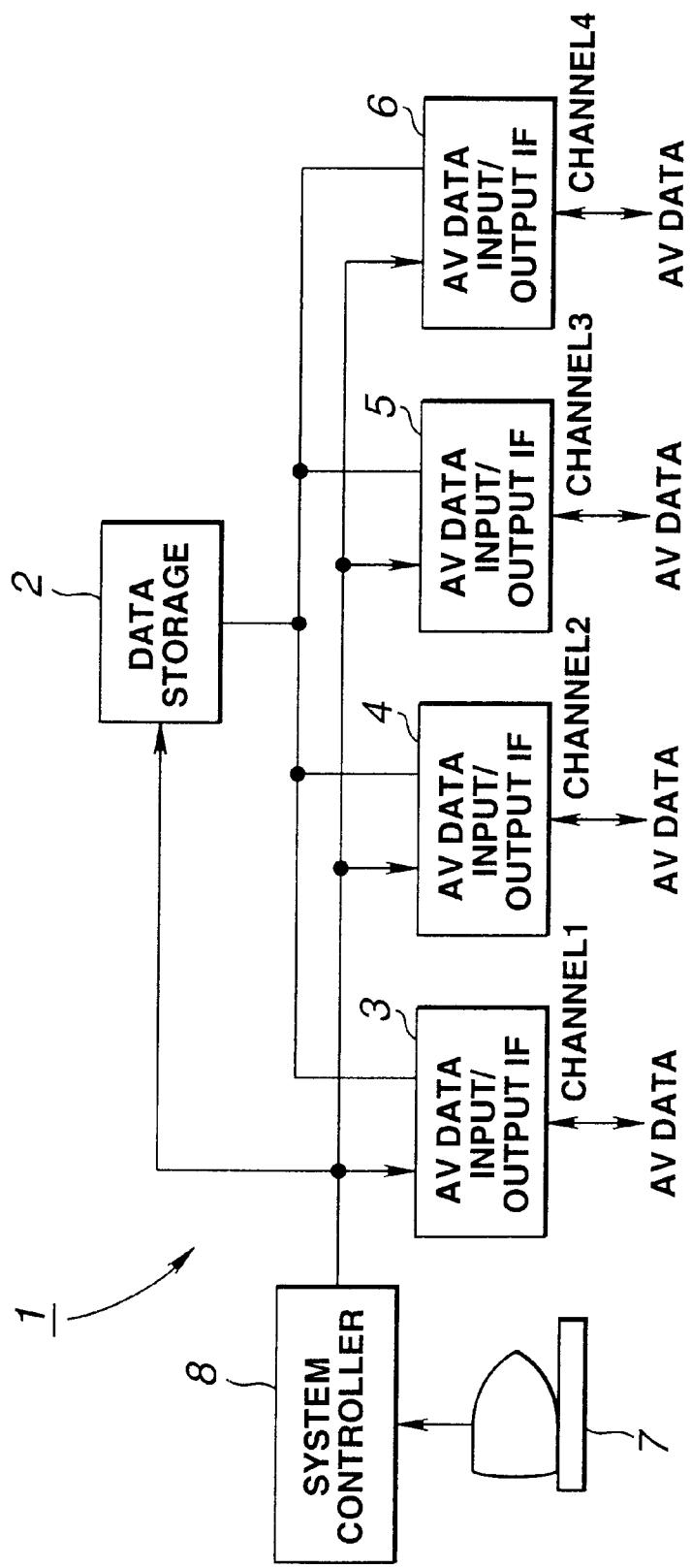
FIG. 1 is a block diagram showing the structure of an AV server system embodying the present invention.

Referring to the drawings, preferred embodiments of the present invention will be explained in detail. An AV server system 1 records, reproduces, edits and distributes AV data (audio video data) over plural channels, and includes a data storage device 2 in which to store AV data, AV data input/output interfaces (IFs) 3 to 6, for having access to the data storage device 2 to input/output the AV data, an editing device 7, and a system controller 8 for performing overall control of the entire system. Although the preferred embodiment is directed to a 4-channel system employing four AV data input/output Ifs 3 to 6, there is no particular limitation to the number of the channels used.

Each of the AV data input/output interfaces (IFs) 3 to 6 has a memory for timing adjustment at the time of outputting AV data from the data storage device 2 or of inputting (recording) the AV data in the data storage device 2. For convenience in explanation, the AV data input/output interfaces (IFs) 3 to 6 are referred to below as channels 1 to 4, respectively.

The data storage device 2 is of a so-called multi-channel type of the RAID (Redundant Arrays of Inexpensive Discs) system having an array of plural hard disc drives (HDDs), and is configured for independent concurrent AV data read-out or writing in a pre-set area of each hard disc on the channel basis.

In order to permit the AV data to be recorded or reproduced simultaneously over the four channels as described above, the present AV server system 1 time-divisionally allocates the time during which the system controller 8 can have access to the data storage device 2, that is the time slot. Specifically, the system controller 8 sets a one-period time as a fixed period and divides this one period time into four equal portions which are allocated as time slots in the sequence of the channels 1, 2, 3 and 4.

It is noted that the length of the time slot allocated to a channel is equal to the time during which the amount of the AV data that can be continuously reproduced during one period until the next time slot can be stored from the data storage device 2 to the memory of the channel in question. Thus, with the present AV server system 1, the AV data of the channel in question can be continuously outputted from the memory of the channel until the time is the next time slot to permit uninterrupted reproduction.

During recording, the processing which is the reverse of the above-described processing, that is the processing of storing AV data in a memory of a given channel during one period and of collectively writing the AV data on the hard disc of the data storage device 2 when the time is the time slot of the channel in question, is performed. Therefore, the length of one period of the time slot is set so as to be as short as possible to permit the amount of the AV data required for reproduction at the usual speed to be read out and stored in the channel memory.

The editing device 7 has an actuating input device, such as a keyboard or a mouse, and a display device, such as a monitor. If the user actuates the actuating input device for doing various setting operations, such as identification of a channel used for inputting or outputting AV data for the data storage device 2, input/output control signals are generated and routed to the system controller 8. The input/output control signals may be exemplified by commands on data recording, data reproduction, stop, slow reproduction or fast reproduction, or auxiliary information such as the search speed information on the reproduction speed multiplication ratio for variable speed reproduction, such as slow reproduction or fast reproduction. The input/output control signals may also be exemplified by a command for endless recording of the AV data to the data storage device 2 or data on various setting items for endless recording as later explained.

The editing device 7 is configured for displaying AV data supplied from the selected channel on a monitor.

The system controller 8 controls the data storage device 2 and the respective channels, based on the input/output control signal from the editing device 7, to perform the processing for recording/reproducing the AV data as follows: That is, during recording, the system controller 8 converts the AV data, inputted on one or more of the above channels, into data of the data form for recording on the data storage device 2, and occasionally compresses the resulting data to transmit the compressed data to the data storage device 2 for recording thereon. During reproduction, the system controller 8 reads out data from the data storage device 2 and occasionally expands the read-out data to transmit the expanded data to one or more channels for outputting the data as AV data.

The management of a file recorded on the data storage device 2 of the AV server system 1, referred to below as the file system, is hereinafter explained.

The file system is such a system for supervising in which position on the hard disc (HD) of the data storage device 2 has been recorded the file recorded on the HD.

Figure 2A:
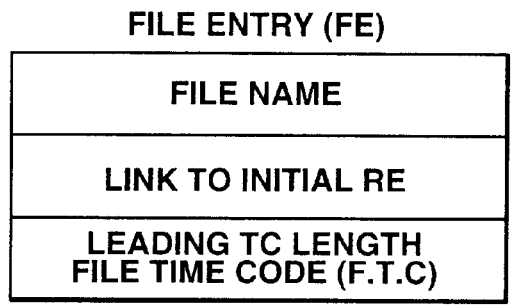
Figure 2B:
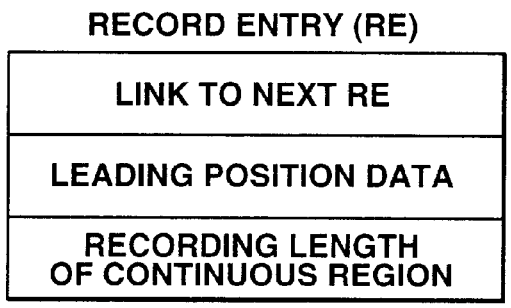
Figure 2C:
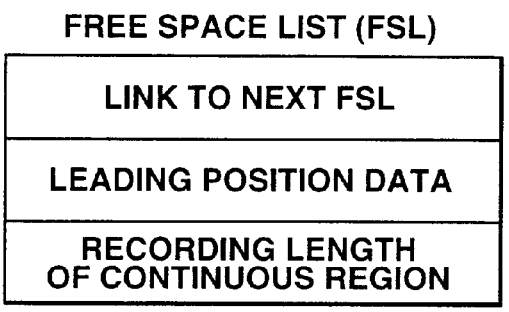

Referring to FIG. 2, the file system is made up of the three information, namely a file entry (FE) (FIG. 2A), a record entry (RE) (FIG. 2B) and a free space list (FSL) (FIG. 2C), and is held by the system controller 8 of FIG. 1.

Referring to FIG. 2A, the file entry is mainly made up of a file name, a link (pointer) to the first record entry, and a file time code (FTC). The file name indicates the file name recorded on the HD. The link to the first record entry indicates the pointer information (link) to the record entry shown in FIG. 2B. The file time code indicates the time code information indicating the time information of the file and is made up of the time code for the leading position recorded on the HD and its length.

Referring to FIG. 2B, the record entry is made up of a link (pointer) to the next record entry, leading position data, and the recording length of a continuous region. The link to the next record entry indicates the pointer information indicating the link destination to the next record entry, while the leading position data indicates the address of the leading position of the continuous region on the file recorded on the HD and the recording length of the continuous region indicates the continuous recording length of the file recorded on the HD. One such record entry is formulated every continuous recording region on the HD, with the respective record entries being interconnected by pointers.

Referring to FIG. 2C, the free space list is made up of a link (pointer) to the next free space list, leading position data and the recording length of the continuous region. The next free space list link indicates the pointer information indicating the link destination to the next free space list, while the leading position data indicates the address of the leading position of an area on the HDD not having data recorded thereon, and the recording length of the continuous region indicates the length of the continuous non-recorded region. The record entry is the information indicating where on the HD the file has been recorded, while the free space list indicates the region where data has not been recorded.

Figure 3A:
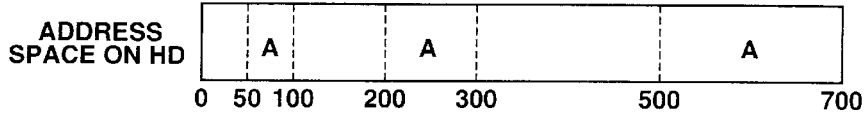
Figure 3B:
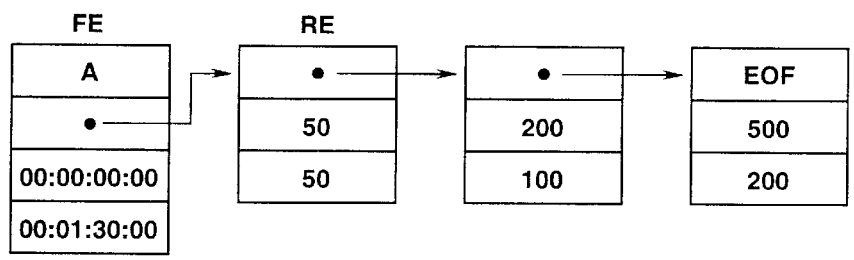

The file system in case the file A has been recorded in addresses 50 to 100, 200 to 300 and 500 to 700 in an address space on the HD shown in FIG. 3A is as follows: That is, "A" indicating the file name is written in a file name area as file entry FE, in the file entry FE, as shown in FIG. 3B. The pointer information "." in FIG. 3B indicating the link destination to the initial record entry is written in the link region of the first record entry. In addition, the time code "00:00:00:00:00" (hour: minute: second frame ) when the file A has been written on the HD and the recording time of the file A: "00:01:29:29" (one minute 29 second 29 frames, indicating that the file for one minute 30 seconds in NTSC has been recorded on the HD) are written. In the link destination of the first record entry of the file entry, there are written the address of the leading position of the first continuous region and the address values indicating the length of the continuous region, both equal to "50", are written, as shown in FIG. 3B. Since the file A is also written in a skipping fashion in downstream side regions, so that the pointer information indicating the destination of the next record entry ("." in FIG. 2B) is written.

Since the file A is consecutively recorded from the address 200 a length equal to 100, so that the leading position data is "200", with the consecutive recording length being "100". The file A is further recorded as from the address 500, so that the leading position data for the next record entry is "500", with the consecutive recording length being "200" as from the recording is up to the address 700. Since the file A is not recorded as from this address, the link to the next record entry is "EOF" (end-of-file).

Figure 3C:
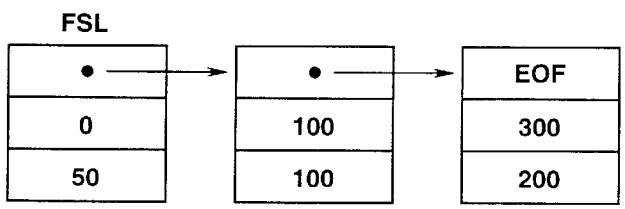

The free space list is the region on the address space of the HD shown in FIG. 3A, devoid of any recording, that is the region as from address 0 to address 50, from address 100 to address 200, and from address 300 to address 500, so that the leading position data and the consecutive recording length are configured as shown in FIG. 3C, for each consecutive region, as in the record entry.

Figure 4:
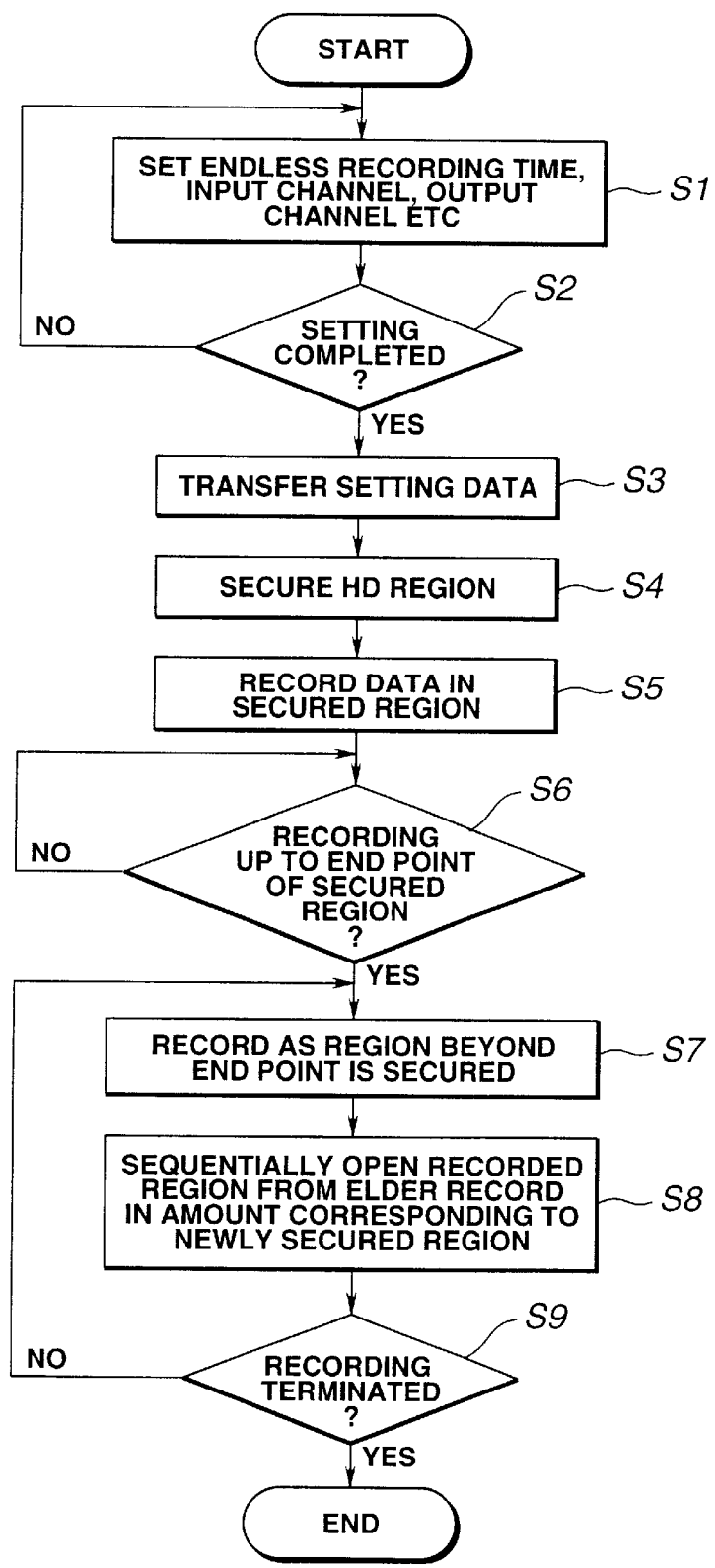
FIG. 4 is a flowchart for illustrating the processing of endless recording in the AV server system.

The basic processing of the endless recording to be executed by the present AV server system 1 is explained with reference to the flowchart of FIG. 4 and to FIGS. 5 to 7.

The endless recording in the present invention is executed as the address space of the HD is moved stepwise. This is performed to eliminate the inconvenience that data are present in discrete regions on transient storage. In the following, the endless recording is first explained, and the partial saving executed in the course of the endless recording is subsequently explained.

On starting the endless recording, an input channel for inputting and recording AV data for recording during the endless recording and an output channel for reproducing and monitoring the recording contents during the recording are set. For this setting, the user enters the respective setting items, using a keyboard or a mouse, so that the setting items will be displayed on a monitor screen with a keyboard or a mouse.

In the following explanation, it is assumed that the endless recording time is one hour, an input channel is the channel 1 and an output channel is the channel 2.

If the inputting of the setting items comes to a close, a selection picture as to whether the setting is to be changed or completed is displayed at step S2. If the selection for completing the setting is selected, the program moves to step S3.

At step S3, the editing device 7 transfers data for the respective setting items as set at step S1 and a command for endless recording as an input/output control signal to the system controller 8 and to the respective channels.

At the next step S4, the data storage device 2 performs the processing of securing a pre-set region of the hard disc, based on the control signal from the system controller 8. Specifically, the system controller 8 refers to the free space list of the file system to secure a pre-set region on the hard disc, in an amount permitting the recording for the endless recording, herein one hour, as set at the above-mentioned step S1. This sets the endless recording length, shown in FIG. 5A, as a recording unit which permits recording for a time duration corresponding to the time duration of the endless recording.

Figure 5A:
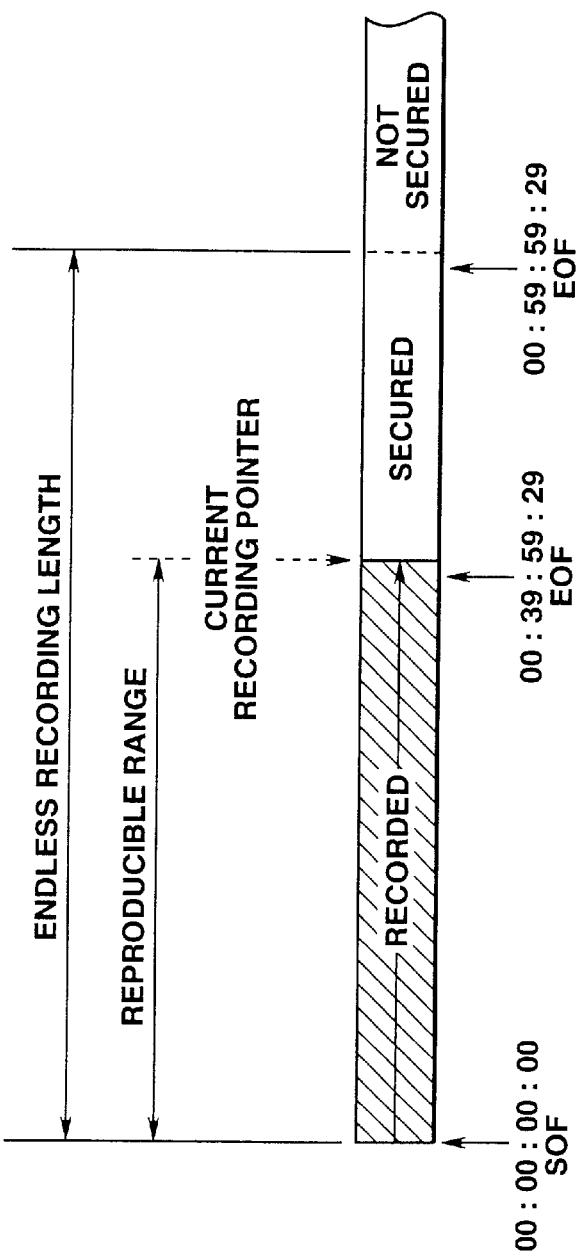
FIG. 5 is a timing chart for illustrating the processing for endless recording and particularly showing the case in which the actual recording length has not as yet reached the endless recording length.

At the next step S5, the system controller 8 controls the pertinent channel and the data storage device 2 so that the AV data will be recorded in the region secured at step S4. In the preferred embodiment, the channel 1 and the data storage device 2 are controlled for recording the AV data inputted via the channel 1 as the input channel. In the AV server system 1, the recorded contents are reproduced, using the channel 2, at the sane time as this recording at this step S5 is started, for enabling the monitoring and the editing. Also, when this recording is started, the address on the hard disc at the time point of the starting of the recording becomes the leading end of the file (start of file or SOF), as shown in FIG. 5A.

Meanwhile, FIG. 5 shows the case in which recording for approximately 40 minutes has been done up to 00:39:59:29 (39 minutes 59 seconds 29 frames) has been made, with the actual recording length not reaching the endless the recording length.

Figure 5B:
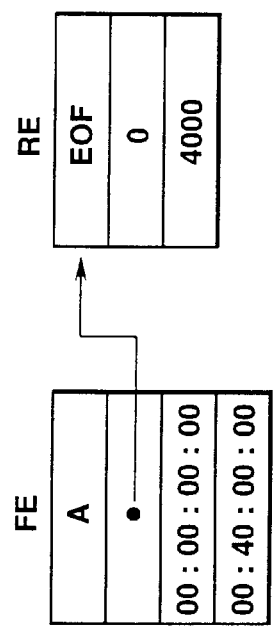

The contents of the above-described file system are shown in FIG. 5B, from which it is seen that the file entry (FE) is made up of file "A" indicating the file name and 00:40:00:00 because the leading time code of the file time code is 00:00:00:00 (0 hour 0 minute 0 second 0 frame), with the recording time length being 40 minutes from 00:00:00:00 up to 00:39:59:29 (0 hour 39 minutes 59 seconds 29 frames). Since the record entry RE is recorded from address 0 in the consecutive region, there is no record entry to the next (EOF). If the address indicated by the current recording point is e.g., 4000, this value is inserted in the record entry. In actuality, an address for one hour is written in the consecutive recording length of the record entry by the processing of securing the above-mentioned pre-set region. If the address value indicated by 00:59:59:29 of FIG. 5A is 6000, this value is written as the consecutive recording length of the record entry. However, the record entry is expressed as the record entry shown in FIG. 5B for convenience in explanation.

It is noted that the region as from the SOF of 00:00:00:00 up to the EOF of 00:39:59:29 is the range that can be reproduced using the channel 2. In the preferred embodiment, the system controller 8 sets a pointer (current recording pointer) and moves this recording pointer to control the channel 1 and the data storage device 2 to effect recording so as to follow up with the pointer movement. That is, the SOF is moved with the movement of the current recording pointer.

Figure 6A:
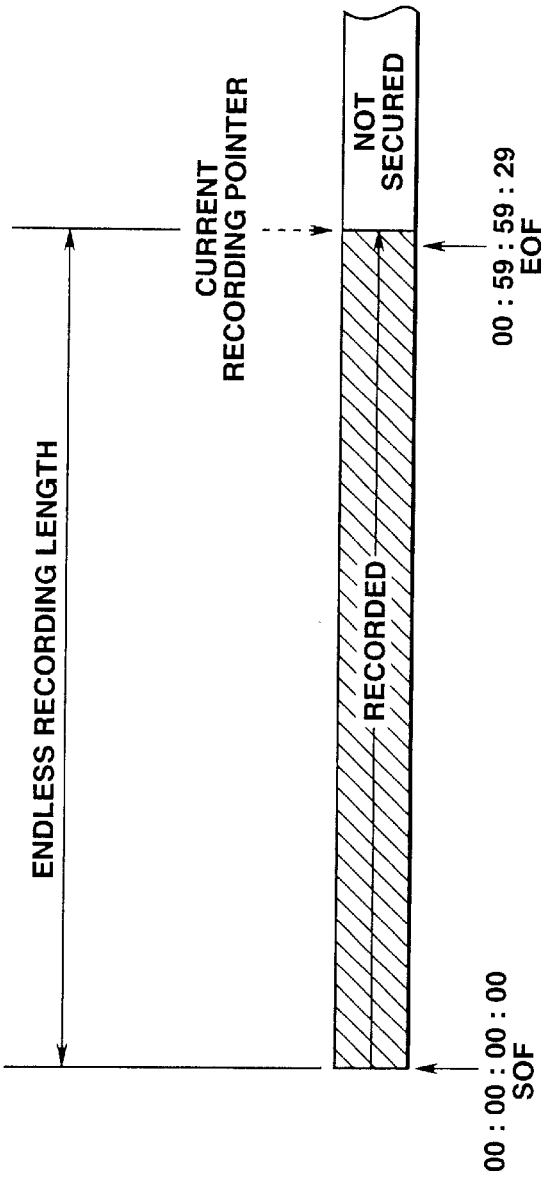
FIG. 6 a timing chart for illustrating the processing for endless recording and particularly showing the case in which the actual recording length has reached the endless recording length.

At the next step S6, the system controller 8 checks whether or not the current recording pointer of the data storage device 2 has reached the end of the endless recording length, that is whether or not the data has been recorded up to the end point of the secured region. The system controller is at a standstill at step S6 until the recording is done up to the final recording point, the system controller 8 proceeds to step S7 on recording up to the final recording point. In the preferred embodiment, 00:59:59:29 (59 minutes 59 seconds 29 frames) is the end point of the secured region. FIG. 6A shows the case in which the recording has been made up to this end point.

Figure 6B:
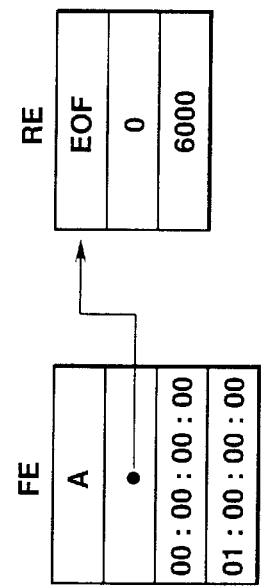

The contents of the file system is as shown in FIG. 6B. That is, the file entry is expressed as 60 minutes from 0 hour 0 minute 0 second 0 frame to 50 minute 59 second 29 frame (00:59:59:29), that is 01:00:00:00, while the record entry is expressed as the linear recording length of 6000 from the leading address of 0.

At step S7, the system controller 8 controls the channel 1 and the data storage device 2 so that data recording will be continued as the processing of newly securing the region ahead of the end point of the secured region, that is an unsecured region, is being prosecuted.

Figures 7A, 7B:
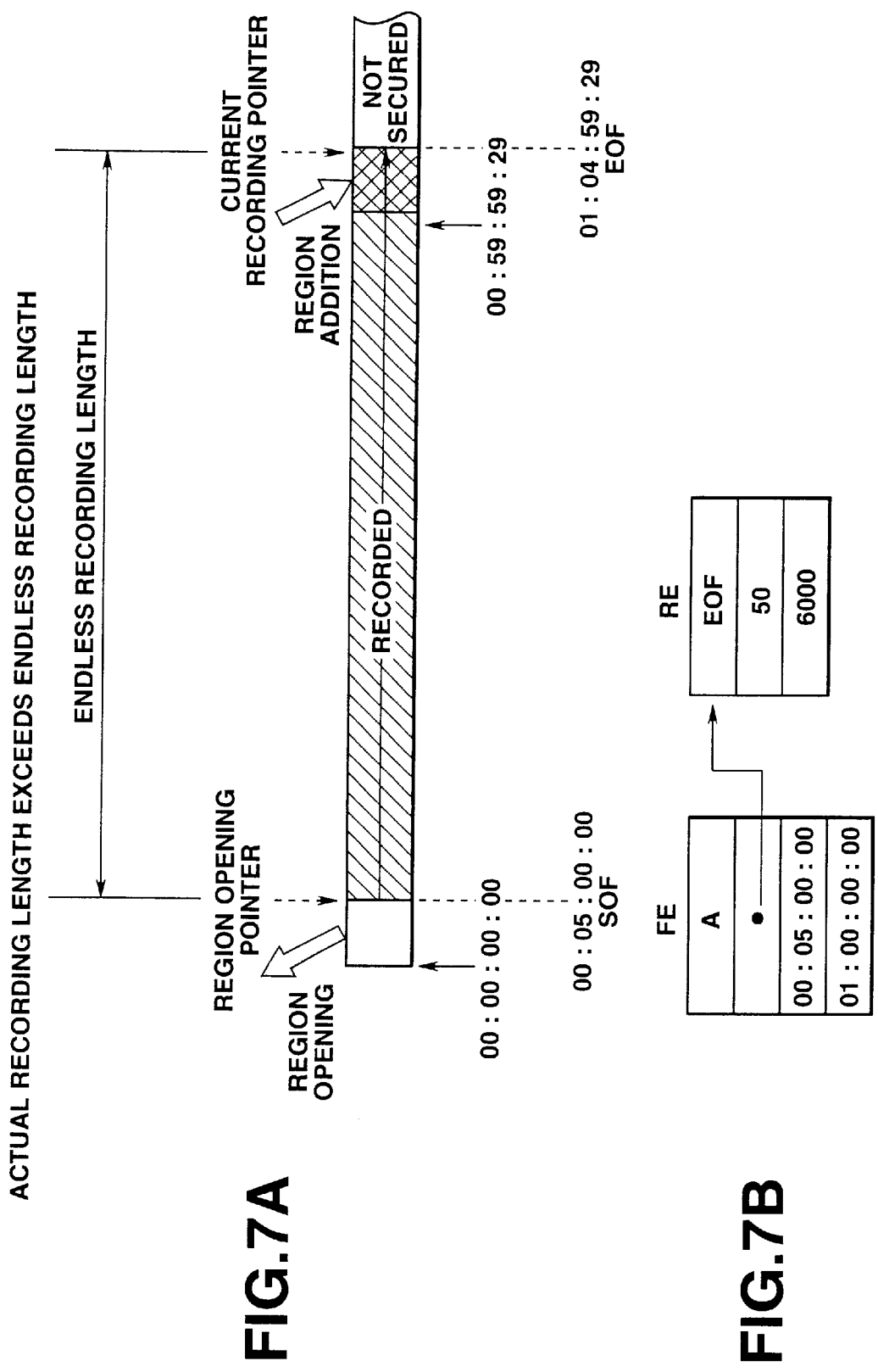
FIG. 7 a timing chart for illustrating the processing for endless recording and particularly showing the case in which the actual recording length has exceeded the endless recording length.

At the next step S8, the system controller 8 controls the data storage device 2 so that the recorded region of the file sequentially beginning from the older region will be evacuated in an amount corresponding to the newly secured region, as shown in FIG. 7A. In the preferred embodiment, the system controller 8 sets a pointer (region evacuating pointer) to evacuate the recorded region to move the region evacuating pointer to effect region evacuation to follow the pointer movement by way of controlling the data storage device 2. That is, by the movement of the region evacuating pointer, the SOF and the time code are moved. Since the amount of movement of the current recording pointer is equal to that of the region evacuating pointer, the length of the endless recording length is kept unchanged.

FIG. 7B shows the contents of the file system when the recording is terminated in a state shown in FIG. 7. The leading time code is 5 minutes (00:05:00:00), while the recording length is one hour (01:00:00:00). The leading position address is 50 which is the address in which the region opening pointer is positioned, while the recording length is one hour and unchanged from that of FIG. 6B and is 6000 indicating the address length for one hour.

At the next step S9, the system controller 8 detects an input/output control signal from the editing device 7 to check whether or not the endless recording is to be terminated. The system controller 8 manages control to repeat the processing of the steps S7 to S8, until a command of terminating the endless recording is issued by the user actuating the editing device 7. If the command is issued and the editing device 7 has detected the input/output control signal including a command to that effect, the endless recording is terminated.

In the AV server system 1, the latest contents corresponding to the endless recording time as set at step S1 has been recorded in the effective recording area of the hard disc on termination of the endless recording. That is, in this illustrative setting, if this region recorded on the hard disc is reproduced at an optional channel as from the SOF, the recording contents for the latest one hour is reproduced.

If, during this endless recording, the current recording pointer has reached the end point of the recording area of the hard disc, it suffices to restore the current recording pointer to the 00:00:00:00 position of the time code shown in FIG. 2 to continue the recording. Since the region of the hard disc as from the position 00:00:00:00 has already been evacuated, it suffices to perform the recording as this region is still kept.

The endless recording method on the AV server system 1 resides in "securing a new region after recording for a pre-set time duration to continue the recording, and sequentially evacuating the disc region from the region having recorded thereon the oldest contents in an amount corresponding to the newly secured region". Since this enables the entire disc region to be utilized comprehensively, the data storage device 2 may be improved in durability.

Figure 8:
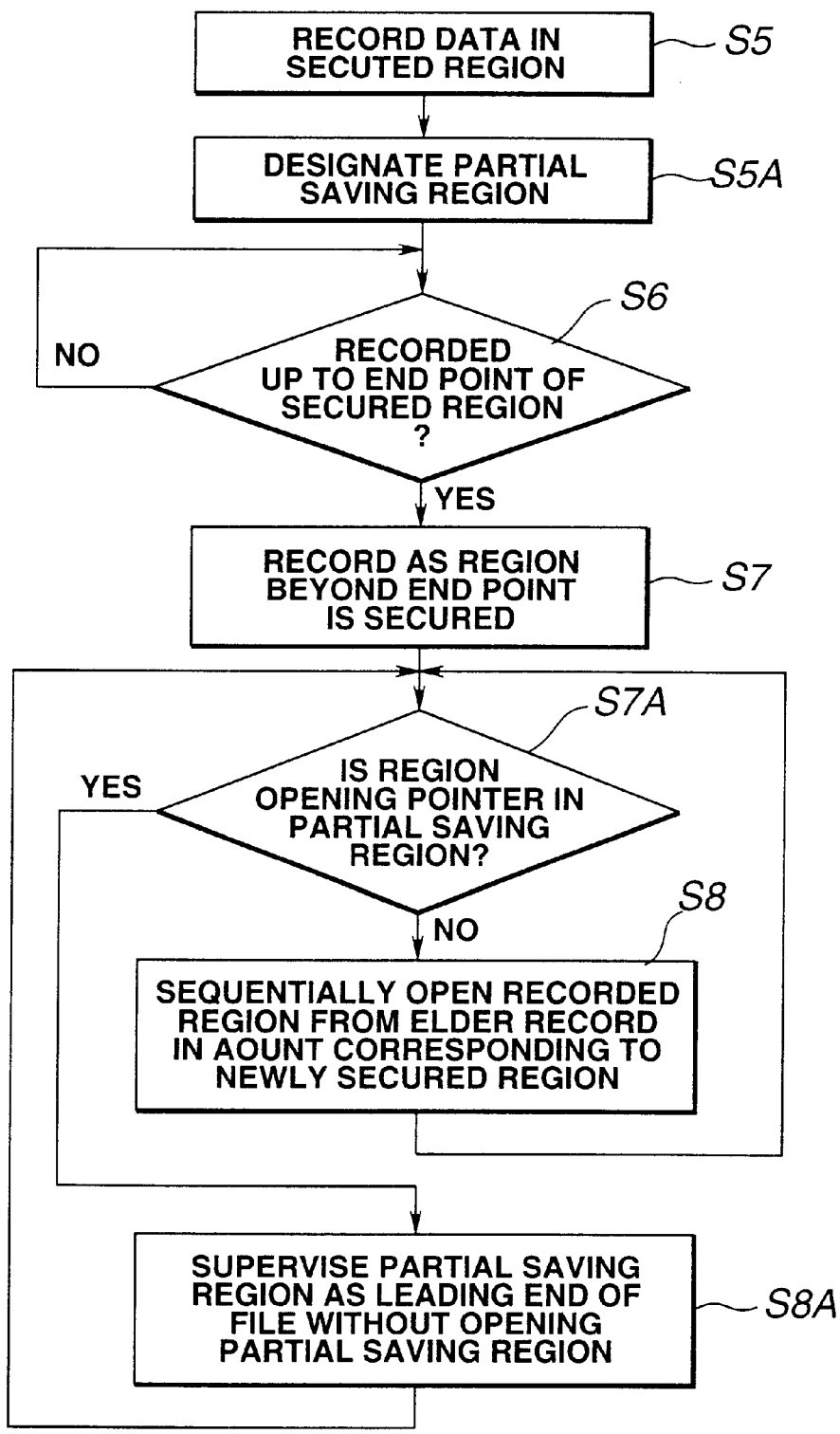
FIG. 8 is a flowchart for illustrating the processing of saving a portion of the recording contents as endless recording is underway.
Figure 9A:
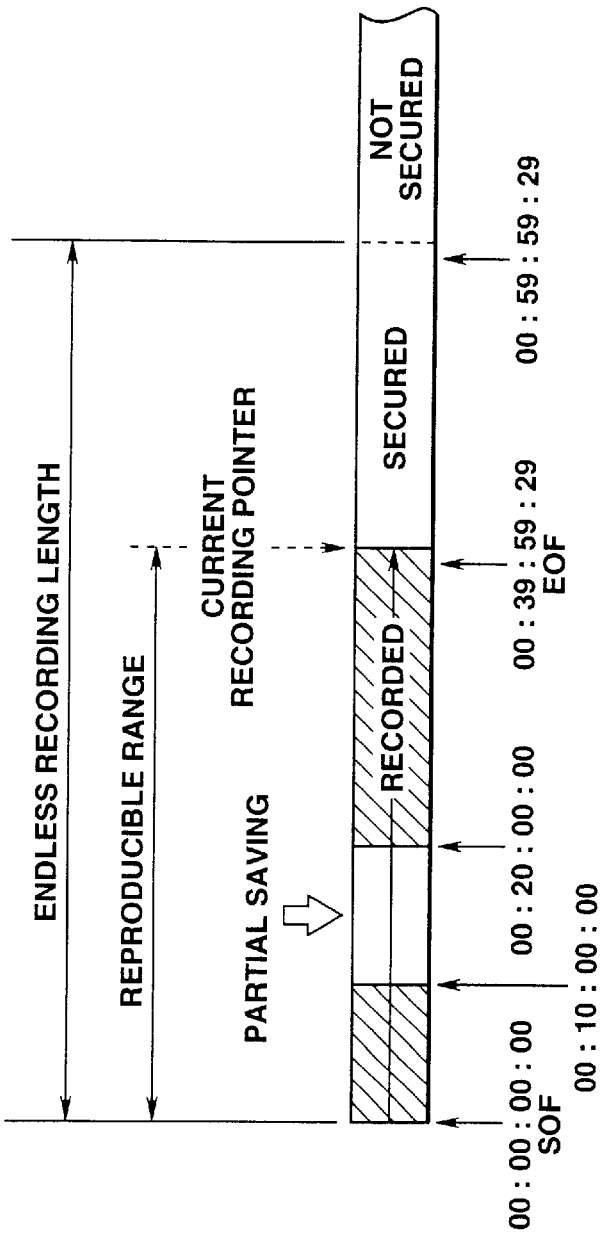
FIG. 9 is a timing chart for illustrating the processing of saving a portion of the recording contents as endless recording is underway and particularly showing the case in which the actual recording length has not as yet reached the endless recording length.
Figure 9B:
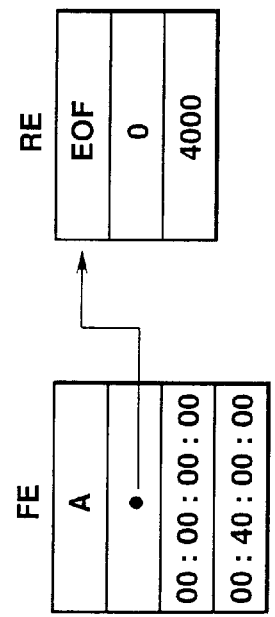
Figure 10A:
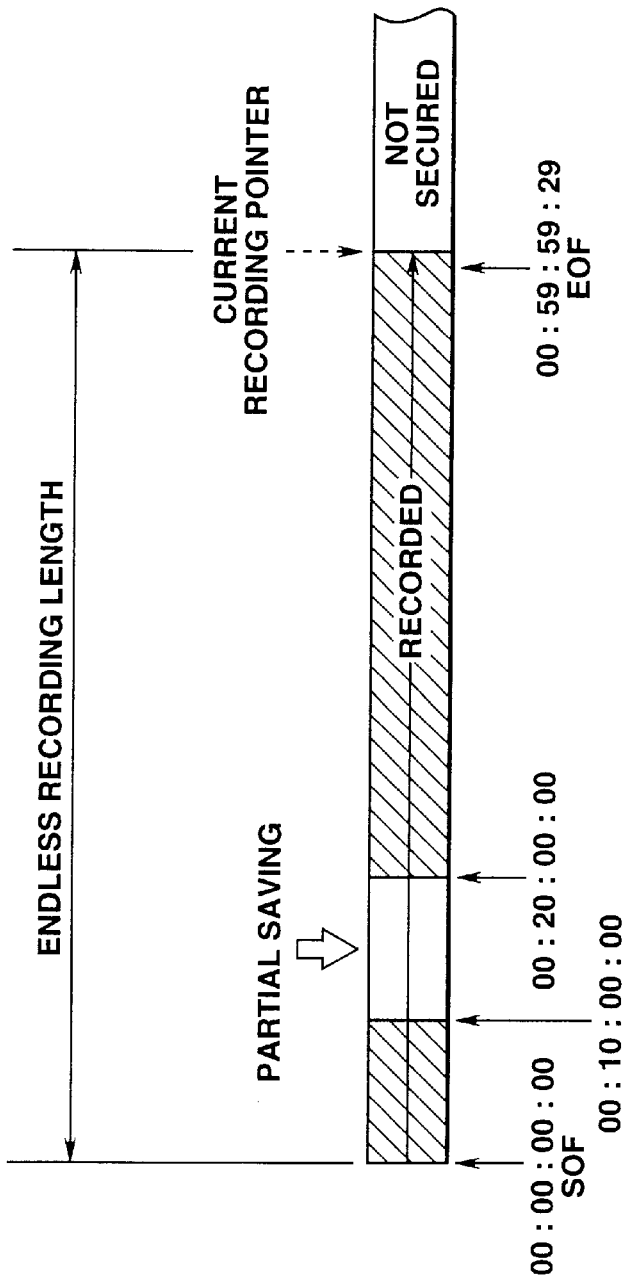
FIG. 10 is a tinning chart for illustrating the processing of saving a portion of the recording contents as endless recording is underway and particularly showing the case in which the actual recording length has reached the endless recording length.
Figure 10B:
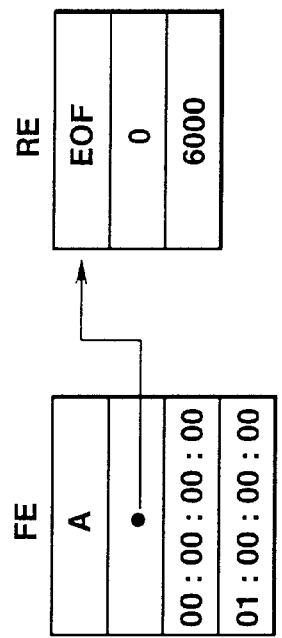
Figures 11A, 11B, 11C:
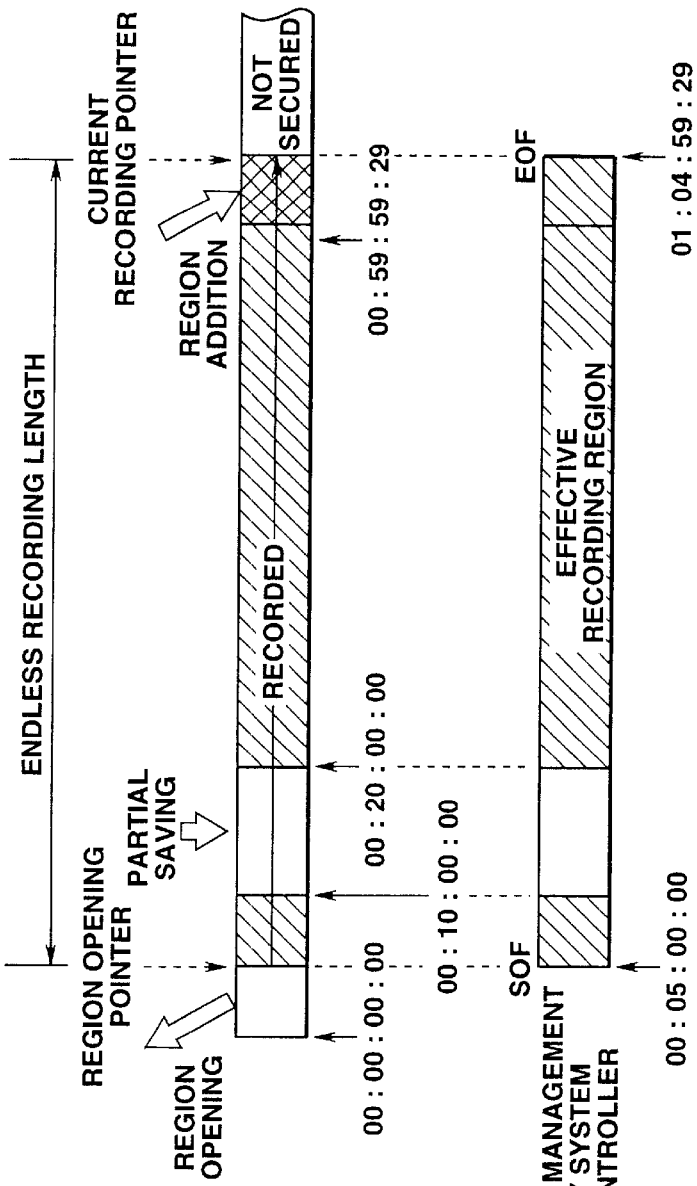
FIG. 11 is a timing chart for illustrating the processing of saving a portion of the recording contents as endless recording is underway and particularly showing the state in which the actual recording length has exceeded the endless recording length, with a region freeing pointer is about to reach the partial saving designation region.

In the AV server system 1, part of the recording contents of the AV data being recorded or previously recorded can be saved as the above-mentioned endless recording is prosecuted. The processing in which part of the recording contents is saved as the endless recording is going on is explained with reference to the flowchart of FIG. 8. Meanwhile, in the flowchart of FIG. 8, the same processing as that of FIG. 4 is denoted with the same step number as that used in FIG. 4. FIGS. 9, 10 and 11 are associated with FIGS. 5, 6 and 7, respectively. That is, FIG. 9 shows the state in which endless recording set to one hour has been executed for 40 minutes and more specifically shows the state in which, of the total recording contents of 40 minutes of the endless recording, 10 minutes of the AV data after lapse of 10 minutes as from the start of the recording are to be saved.

If part of the recording contents is to be saved as the endless recording is proceeding, the area to be saved by the user actuating the editing device 7 is designated at step S5A after the start of the recording of step S5A. The processing of step S5A is to designate for partial saving the 10-minute region of, for example, 00:10:00:00 to 00:19:59:29 by the user reproducing the data of the reproducible region using the channel 2 to monitor the reproduced data on a monitor of the editing device 7, or by the user actuating the editing device 7 in real-time during the endless recording with the channel 1. The designated region is hereinafter termed the partial saving region.

If the partial saving region is designated at step S5A, the system controller proceeds through the above-mentioned steps S6 and S7 to the step S7A. FIG. 10 corresponds to FIG. 6 and shows the state in which the recording has been made up to the end point of the secured region and the program is about to move to step S7. If partial saving has been designated, but the state is as shown in FIG. 9 or 10, the contents of the file system are as those of FIG. 5B or 6B. These contents are shown in FIGS. 9B and 10B, respectively. FIG. 11 corresponds to FIG. 7 and shows the state in which data recording is continued as the processing of newly securing the region ahead of the end point of the secured region, that is an unsecured region, is being prosecuted. The file contents in this state, shown in FIG. 11, are the same as those shown in FIG. 7B.

Figures 12A, 12B, 12C:
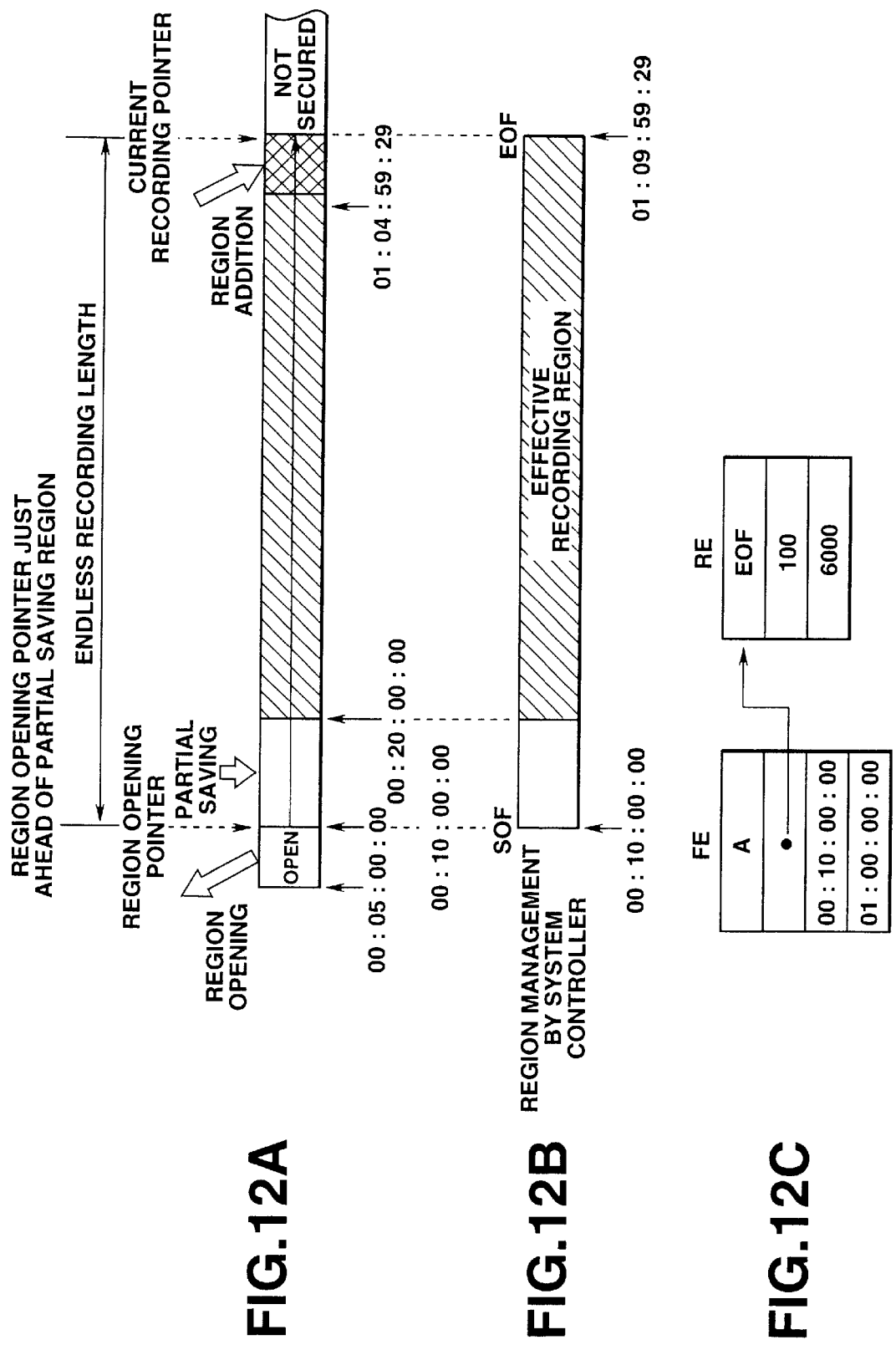
FIG. 12 is a timing chart for illustrating the processing of saving a portion of the recording contents as endless recording is underway and particularly showing the state in which the region freeing pointer has reached a portion just ahead of the partial saving designation region.

At step S7A, the system controller 8 checks whether or not the region evacuating pointer is within the partial saving region. If it is found at step S7A that the region evacuating pointer is within the partial saving region, the system controller 8 proceeds to step S8 and, if otherwise, to step S8A. Since the region evacuating pointer in the state shown in FIG. 11 is not within the partial saving region, the processing of FIG. 8 is carried out to sequentially erase the old recording contents from the hard disc of the data storage device 2. FIG. 12 shows the state in which the region evacuating pointer has come to a position directly ahead of the partial saving designating region. It is directly after this time that the processing of the step S8A is executed.

Figures 13A, 13B, 13C:
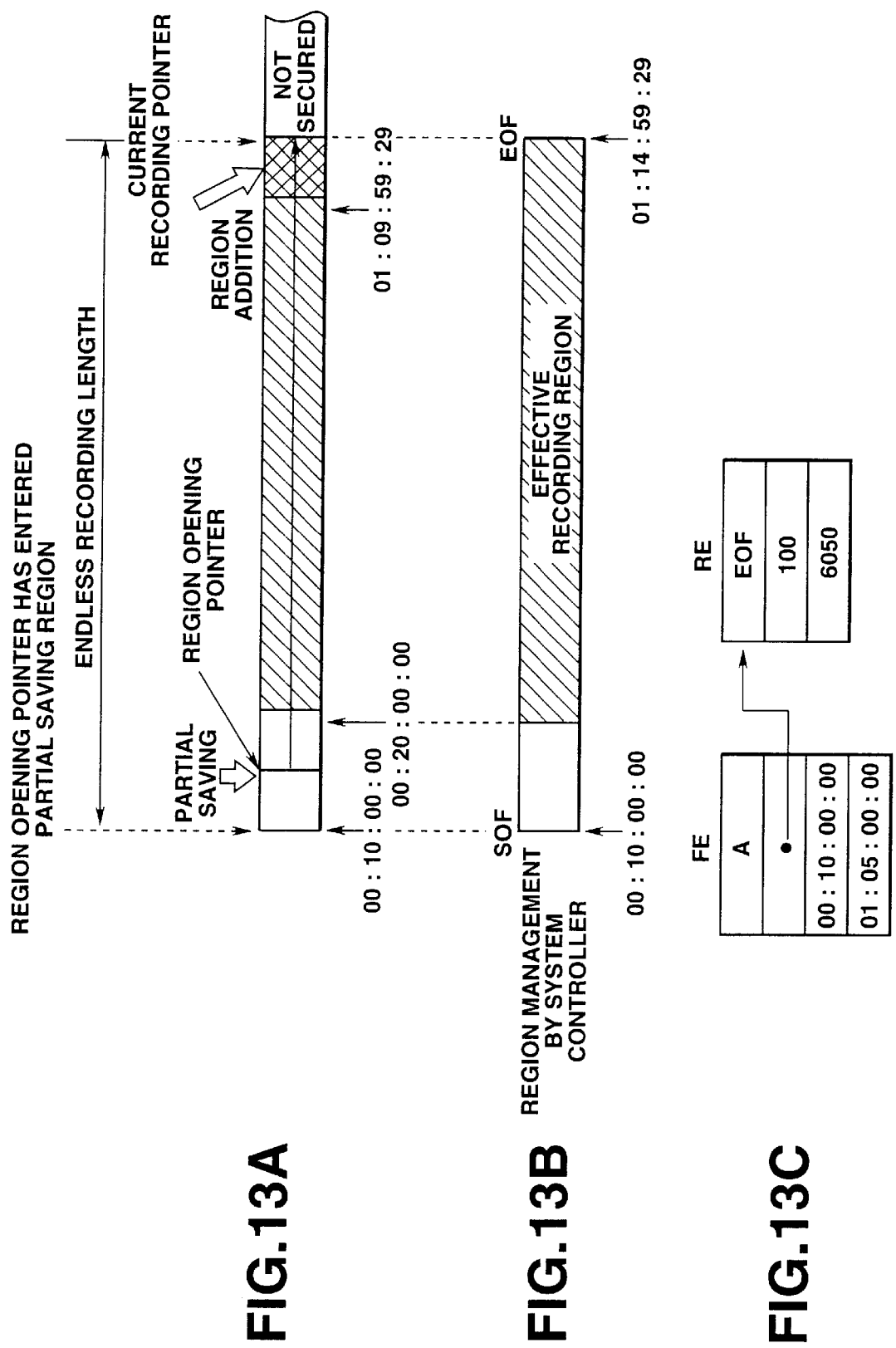
FIG. 13 is a timing chart for illustrating the processing of saving a portion of the recording contents as endless recording is underway and particularly showing the state in which the region freeing pointer has entered the partial saving designation region.

At step S8A, the system controller 8 controls the data storage device 2 so as not to evacuate the partial saving region. The system controller 8 manages control with this partial saving region as the leading end of the file and subsequently reverts to step S7A to repeat the above-mentioned processing. Specifically, the system controller 8 assumes that this partial saving region to be the file of the same attribute as the recorded region and supervises this partial saving region as the leading end portion within the same file. In the AV server system 1, the processing of step S7, rather than the processing of step S8, is executed as long as the processing of step S8 is executed, it is the position of the EOF, rather than the position of the SOF, that is moved, as a result of which the endless recording length is extended a length corresponding to the partial saving region, as shown in FIG. 13A. If the region evacuating pointer is at a position of 00:15:00:00 in terms of the time code shown in FIG. 13A, the region of five minutes is supplemented. The contents of the file system at this time is as shown in FIG. 13C, in which the leading time code is 00:10:00:00 and the recording length is extended by 5 minutes and is 65 minutes (1:05:00:00). Since the address value specifing the leading end position of partial saving is the leading end address and is equal to the length up to the position of the current recording pointer, the record entry has the recording length of "605D", as shown in FIG. 13C.

When the region evacuating pointer has traversed the partial saving region, the recorded region of the hard disc is again sequentially evacuated beginning from the older recording.

Figures 14A, 14B, 14C:
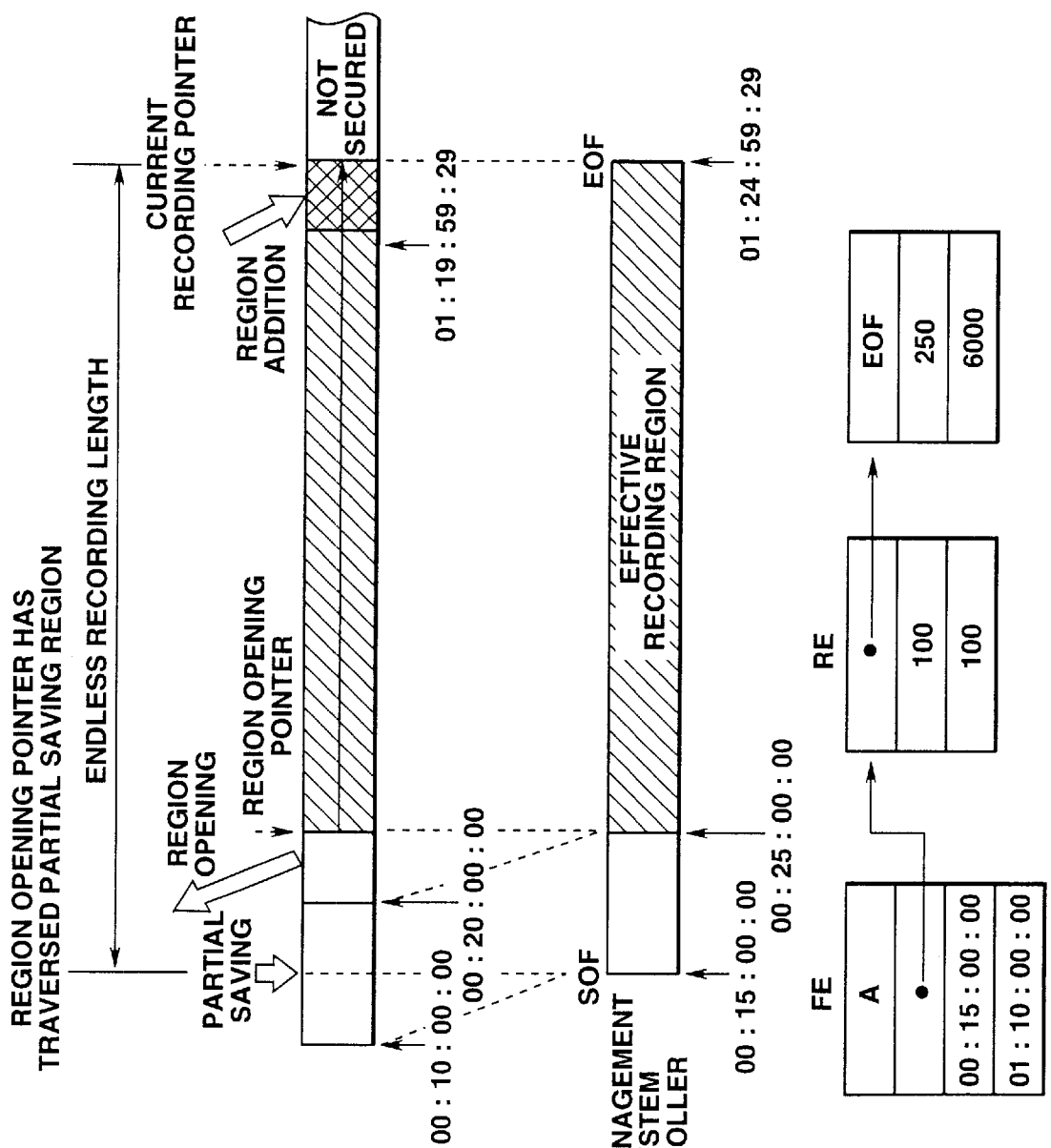
FIG. 14 is a timing chart for illustrating the processing of saving a portion of the recording contents as endless recording is underway and particularly showing the state in which the region freeing pointer has traversed the partial saving designation region.

The specified method for performing file management at step S8A is explained. The system controller 8 performs the processing of re-arranging the region designated for partial saving at a position directly ahead of the region evacuating pointer, at the same time as the region evacuating pointer traverses the partial saving region, as shown in FIG. 14B. Specifically, the system controller 8 updates the time code of the partially saved region so as to follow the region evacuating pointer. This updating is continued until the endless recording comes to a close. That is, the region evacuating pointer plays the role of indicating the position (address) of the oldest data that currently remains recorded, that is not evacuated. Thus, the system controller 8 updates the time code of this partial saving region so that the partial saving region will follow the region evacuating pointer without the region evacuating pointer getting a long lead on the partial saving region. Thus, the system controller 8 manages control to set the partial saving region so that the partial saving region will be relocated ahead of the oldest (non-evacuated) data that remains recorded on the hard disc.

More specifically, the contents of the file system are assumed to be as shown in FIG. 14C. That is, the leading time code of the file entry is caused to follow the region evacuating pointer and a non-consecutive region is produced in the partial saving region, so that one entry information of the record entry is supplemented. The leading time code in the file entry is 00:15:00:00 and the time length is extended by ten minutes corresponding to the partial saving time, so that the record entry is of the content shown in FIG. 14C in which 100 addresses from the leading address 100 to the address 200 represent the recording length, linking image data is made to the next record entry and there is written the recording length 6000 of the address of one and a half hour recording as from the address 250 of the region evacuating pointer. The record entry of the first entry (leading address 100, recording length 100) represents the partially saved region. The record entry value is not changed even in the advanced state of the pointer from the current recording pointer.

Figure 15:
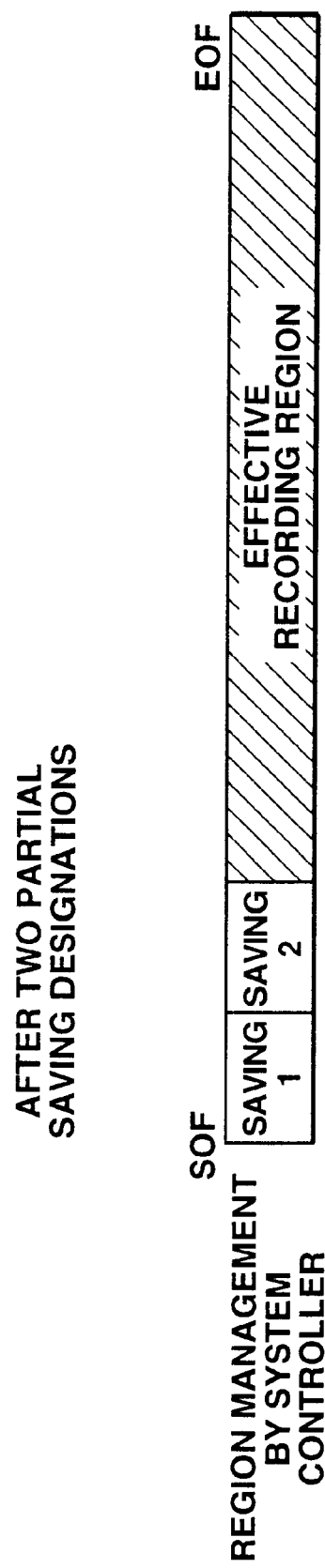
FIG. 15 illustrates region management by the system controller in case the partial saving designation has been made a plural number of times.

The result is that, in the AV server system 1, the partial saving region and the endless recorded region are re-located in this sequence by the system controller 8 from the leading end of the file (SOF) towards the end of the file (EOF). If, for example, partial saving designation is done twice during the endless recording, the region first designated for parietal saving, the region designated for parietal saving in the second place, and the endless recorded region, are re-located in this order, as shown in FIG. 15, these regions being managed as the file system by the system controller 8. If there is third and the following designations for partial saving, the third and the following designations for partial saving are accumulated in a similar manner.

In this manner, in the AV server system 1, the regions designated for partial saving are sequentially accumulated at the leading end of the file, with the endless recorded contents being managed in their entirety by the system controller 8 as the file of the same attribute. Thus, with the AV server system 1, the user searching the leading and trailing areas of the file using high-speed reproduction of the so-called jog or shuttle mode in one channel is able to view both the contents of the region designated for partial saving and those of the region being recorded by endless recording.

With the AV server system 1, since the partially designated regions are accumulated at the leading end of the file as if these regions are edited by cut-editing, it is possible to reproduce the required recording contents promptly to improve the operating efficiency of the retrieval and editing operations significantly.

Also, in the AV server system 1, the saved regions are accumulated at the leading end of the file and handled as being the same file, reference may be had to the saved regions by high-speed reproduction, such as jog-mode or shuttle-mode reproduction, even after the end of the endless recording.

Although the data storage device 2 in the preferred embodiment is configured as a hard disc, the present invention may similarly be applied to a non-linear accessible (random-accessible) recording medium. Thus, the data recording device 2 may be configured as a disc-shaped recording medium, such as an optical disc, e.g., DVD (digital video disc) or a MO (magneto-optical disc), or an optical memory, such as DRAM or a semiconductor memory, such as a flash memory. The file time code of the file system may also include the current time in addition to the cumulative time information as from the start of recording.

According to the present invention, as described above, there are provided a data recording method and a data recording/reproducing method whereby endless recording is realized to permit facilitated editing or management.

What is claimed is:

1. A data recording method in which input data from outside are processed by respective ones of a plurality of input processing means and the processed input data are outputted to a non-linear-accessible recording medium only within an allocated time slot so as to be recorded on said recording medium, comprising:
    a first step of securing a first recording region of said recording medium in which said data is recorded;
    a second step of sequentially recording said data in said first recording region of said recording medium;
    a third step of newly securing a second recording region and sequentially recording said data in said second recording region when the data is recorded up to the end position of said first recording region; and
    a fourth step of sequentially evacuating the oldest recorded region of said first recording region in an amount equal to said second recording region secured in said third step.

2. The data recording method according to claim 1 further comprising:
    the fifth step of designating said first recording region and/or said second recording region for saving so that the data recorded in said first recording region and/or said second recording region will not be overwritten by the remaining portion of said data; wherein
    if said recording region is designated for saving in said fifth step, said recording region designated for saving is not evacuated.

3. The data recording method according to claim 2 wherein the first recording region is secured in said first step by registering the information of said first recording region in the recording position information constituted by the recording start position information indicating the position of the recording medium where the recording is started and the recording length information of the recording region carrying continuous recorded data.

4. The data recording method according to claim 3 wherein the recording start position information is updated depending on a recording position in which the data is sequentially recorded in the second recording region to evacuate the first recording region.

5. The data recording method according to claim 4 wherein, if the information on the recording start position is updated beyond the recording region in which partial saving has been made in said fifth step, and wherein said recording position information is constituted by the first recording position information made up of the information on the recording start position in the recording region where partial saving has been made and the continuous recording length and the second recording position information made up of the recording start position information of the recording region where the recording is made and the continuous recording length.

6. The data recording method according to claim 4 wherein, if the data is sequentially recorded in said first recording region, the data is registered in the time information constituted by the start time information indicating the start time of recording in the first recording region and the time length information indicating the time length as from the start time.

7. The data recording method according to claim 6 wherein, if the recording start position is updated beyond the recording region of partial saving in said fifth step, the start time information is updated to follow the updating of the recording start position information.

8. The data recording method according to claim 6 wherein
    said time information is constituted in the file name information indicating the file name of the data recorded in the file form on said recording medium and is registered in the file entry information to which the entry is added from one different file to another, wherein
    said file entry information includes the link information to said recording position information, and wherein
    said file entry information is connected to said recording position information from one file to another.

9. The data recording method according to claim 3 wherein
    address values of the recording medium are inserted into the recording start position information and the continuous recording length information of the recording position information.

10. The data recording method according to claim 1 wherein
    said non-linear accessible recording medium is plural hard discs.

11. A data recording apparatus having a non-linear accessible recording medium and a plurality of input/output processing means for converting data inputted from outside into data recorded on said recording medium, said input/output processing means outputting the data converted within allocated time slots to said recording medium to record the data on said recording medium, comprising:
    control means for securing a first recording region for repeatedly recording said data on said recording medium and for controlling said input/output processing means and said recording medium so that said data will be sequentially recorded in said first recording region;
    said control means newly securing a second recording region when said data has been recorded up to the end position in said first recording region, said control means controlling said input/output processing means and the recording medium so that said data will be sequentially recorded in said second recording region, said control means also controlling said input/output processing means and the recording medium so that a recording region of the same volume as the secured and recorded second recording region will be sequentially evacuated beginning from said first region.

12. The data recording apparatus according to claim 11 wherein
    said control means controlling said input/output processing means and the recording medium so that, when the information commanding partial saving of the first recording region and/or the second recording information so that the data recorded in said first recording region and/or the second recording information will not be overwritten by other data, the recording region designated for partial saving will not be evacuated from said first region.

13. The data recording apparatus according to claim 12 wherein
   said control means holds the record entry information made up of the recording start position information specifying the position of said recording medium where the recording is started and the recording length information of said recording region carrying continuous recorded data;
   the recording start position information of the first recording region and the recording length information of the continuously recorded data on said recording medium being written in said record entry information to secure the first recording region.

14. The data recording apparatus according to claim 13 wherein the recording start position information is updated depending on a recording position in which the data is sequentially recorded in the second recording region to evacuate the first recording region.

15. The data recording apparatus according to claim 14 wherein
   if the recording start position information is updated beyond the recording region designated for partial saving, said control means holds said recording entry information so that said recording entry information will be constituted by the first record entry information made up of the recording start position information of the partially saved recording region and the continuous recording length and the second entry information made up of the recording start position information of the recording region where the recording is performed by being linked to the first record entry information and the continuous recording length.

16. The data recording apparatus according to claim 14 wherein
   said control means further holds the start time information indicating the start time of starting the recording of the first recording length and the time length information indicating the time length as from the start time; and wherein
   wen said data is sequentially recorded in said first recording region, said data is registered in the time information on said data sequentially recorded in the time information.

17. The data recording apparatus according to claim 16 wherein
   if said recording start position is updated beyond the recording region where partial saving has been made, said start time information is updated to follow the updating of said recording start position information.

18. The data recording apparatus according to claim 16 wherein
   said time information is constituted along with the file name information indicating the file name of the data recorded in the file form on said recording medium and is registered in the file entry information to which entries are added from one different file to another;
   said file entry information including the link information to the record entry information, said file entry information being connected to the record entry information on the file basis.

19. The data recording apparatus according to claim 13 wherein
   address values of said recording medium are inserted into the recording start position information and the continuous recording length of said recording position information.

20. The data recording apparatus according to claim 11 wherein
   said non-linear accessible recording medium is plural hard discs.

\* \* \* \* \*